United States Patent
Lew et al.

(10) Patent No.: US 6,644,452 B2
(45) Date of Patent: Nov. 11, 2003

(54) WHEEL HUB WITH CLUTCH

(75) Inventors: Paul Lew, Las Vegas, NV (US); Jason Schiers, Layton, UT (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 09/840,778

(22) Filed: Apr. 25, 2001

(65) Prior Publication Data

US 2002/0157916 A1 Oct. 31, 2002

(51) Int. Cl.$^7$ ................................ F16D 41/24
(52) U.S. Cl. ................ 192/64; 192/45; 192/38; 192/54.52
(58) Field of Search ................ 192/64, 45, 38, 192/54.5–54.52; 384/455, 545

(56) References Cited

U.S. PATENT DOCUMENTS

| | | | | |
|---|---|---|---|---|
| 3,432,016 A | * | 3/1969 | Vogt ........................ 192/45 |
| 4,469,381 A | * | 9/1984 | McGuffie .................. 384/453 |
| 4,770,279 A | * | 9/1988 | Shiozaki et al. ............ 192/45 |
| 4,869,556 A | | 9/1989 | Gees | |
| 5,125,489 A | * | 6/1992 | Cha .......................... 192/44 |
| 5,143,189 A | | 9/1992 | Meier-Burkamp | |
| 5,433,306 A | | 7/1995 | Yang | |
| 5,458,223 A | | 10/1995 | Chen | |
| 5,632,364 A | | 5/1997 | Mercat | |
| 5,676,228 A | | 10/1997 | Lin | |
| 5,738,197 A | | 4/1998 | Kroger et al. | |
| 5,810,139 A | * | 9/1998 | Meier-Burkamp et al. ................ 192/12 BA |
| 5,921,363 A | | 7/1999 | Chiang et al. | |
| 6,065,580 A | * | 5/2000 | Kirk ...................... 192/217.3 |
| 6,123,179 A | * | 9/2000 | Chen ........................ 192/46 |
| 6,155,394 A | | 12/2000 | Shook | |
| 6,302,589 B1 | * | 10/2001 | Van Houtte ............... 280/279 |
| 6,374,975 B1 | * | 4/2002 | Schlanger ................. 192/46 |
| 2002/0070088 A1 | * | 6/2002 | Hsu ......................... 192/64 |
| 2002/0070604 A1 | * | 6/2002 | Kanehisa ................ 301/110.5 |

FOREIGN PATENT DOCUMENTS

FR 0 522 983 A1 * 7/1992 ........... F16D/41/30

* cited by examiner

Primary Examiner—Richard M. Lorence
Assistant Examiner—David D. Le
(74) Attorney, Agent, or Firm—Dana Alden

(57) ABSTRACT

A wheel hub with clutch where power is transferred through a drive, such as a chain that is linked between a pedal arrangement and a gear or gears splined onto the hub. The hub provides free-wheeling when torque is not applied thereto and will instantly engage, transferring an applied torque therethrough and into a wheel connected to the hub when torque is applied as through a pedal arrangement. For locking, the hub includes, as a radial load bearing component, a sleeve whereon a gear or gears are splined, with the splined gear sleeve mounting a thick ring for fitting into an end of a wheel sleeve. The thick ring contains spaced sloping pockets, each containing a ball bearing. The wheel sleeve includes an annular ring that receives the thick ring fitted there and has spaced steps, or the like, formed therein to engage the ball bearing surfaces, transferring torque.

18 Claims, 8 Drawing Sheets

WHEEL HUB WITH CLUTCH

BACKGROUND OF THE INVENTION

1. Field of the Invention

The present invention relates to wheel hubs and primarily bicycle type wheel hubs with clutches where the hub is free wheeling when torque is not being applied to the hub through a gear that is linked by a chain to a peddle arrangement, and will engage to transfer torque to a hub wheel when torque is applied to the peddle assembly.

2. Prior Art

Wheel hubs having clutches capable of free wheeling when a torque is not being applied thereto, as through a chain linked to a peddle arrangement, or like driving arrangement, but will engage to transmit torque to turn a hub wheel as generated by an operator turning such peddle arrangement are, of course, well known, and are in common use. For example, on bicycles that are directly driven through a single gear, or include multi-speed gearing. One such earlier hub design, that is believed to be the basic design of most earlier hubs for use with multi-speed gearing, is shown in FIGS. 1, 2A and 2B and is described as prior art in the Detailed Description portion of this application. This earlier hub, unlike the invention, is a ratchet type design that includes an annular ring gear that has its outer circumference secured to the inner wall of a hub body and includes teeth or notches formed around the ring gear inner circumference that slope in the direction of turning of the hub body when it is free wheeling, and includes pawls that are spring biased and are connected to extend outwardly at spaced intervals from around a peddle assembly that each have a tooth end. In free wheeling operations, the outwardly biased pawl tooth ends will each travel up the slope of each ring gear tooth or annular notch, and with the spring biasing to extend each pawl tooth end to cause the pawl end to travel down the tooth or annular notch face and engage the next tooth or annular notch face. Thereby, when the peddle assembly is turned, that turning will be against the slope of the ring gear teeth or annular notch, and the pawl tooth ends will engage and bind against the ring gear teeth faces or annular notches, transmitting an applied torque through the ring gear and into the wheel hub body to drive the wheel.

The above described spring-actuated ratchet type design for a hub clutch has, since the early nineteen hundreds, been the standard for over-running wheel hub transmissions. In practice, such spring-actuated ratchet type design provides a torque transfer from a peddle assembly, or the like, to turn a wheel at the expense of reliability and durability and accordingly necessitates high-maintenance costs. This is because the hub clutch components, specifically the pawls and their springs, are exposed to high cyclical fatigue and are therefore failure prone. Such failure is characterized by cracked pawls, or broken or bent springs. Typically, in the event of a failure of only one of the springs or pawls, a typical lightweight, high performance wheel hub will suffer a rapid deterioration of the remaining spring pawl components, resulting in total hub failure.

Additionally, earlier systems as have employed ball bearing assemblies for power transfer through a hub to turn a wheel have not included a series of spaced pockets that each incorporates a sloping side configuration like that of the invention and have required that each ball bearing carry both a radial load, that is applied perpendicular to the bearing assembly, and axial loads as are transmitted through the axle. In such earlier systems, higher friction forces have resulted from a scrubbing of the bearing surface as occurs at the portion of the ball bearing that carries radial loads with the bearing portion as supports radial loads tending to rotate faster than the ball bearing portion that is carrying thrust loads. In the invention, radial loads are contained and carried at an annular race and seat portion wherein the spaced sloping pockets of the hub assembly are formed, and the hub assembly preferably includes a separate axle thrust bearing or bearings that incorporate radially spaced needle bearings to support axial loads.

Unlike earlier wheel hub designs, the hub of the invention will not deteriorate when exposed to cyclical fatigue, in that it does not include the vulnerable and unreliable spring biased pawls, but rather employs a unique combination of hub body race arrangement that is formed as spaced sloping pockets and opposing annular ring that includes spaced cup or step segments with ball bearings installed into which opposing sloping pockets and cup or step segments, providing immediate engagement upon receipt of a torque or turning force.

SUMMARY OF THE INVENTION

The invention is in a wheel hub constructed to provide low rolling resistance, greater load carrying capacity with enhanced torque transmission, that is more reliable and will therefore operate reliably at less cost. The hub is free-rolling, providing over-running in a clock-wise or forward turning direction, but provides a nearly instantaneous clutch locking when a peddle or like drive force is applied thereto, as through a chain. So arranged, nearly instantaneous torque transfer is provided through the hub, as when the hub of the invention is in use with a bicycle driven wheel. The hub of he invention facilitates torque transfer through a multitude of ball bearings that are each housed in contoured pockets that interface with an opposing face of an annular ring of the hub body whereto a wheel is supported through spokes, ribs, or the like. The clutch bearing system of the invention is to carry a radial load that is the load that results perpendicular to the hub as from a road surface, with the applied loads transferred through a coupling of the hub outer and annular sections.

For the wheel hub clutch of the invention, the hub outer section pockets slope rearwardly from a greater to lesser height in a direction that is counter to the direction of the applied torque. Thereby, when torque is applied in the direction of hub free-wheeling, ball bearings maintained in the hub pockets will each instantly travel opposite to the applied torque, and travel upwardly along the pocket slopes towards the pockets lesser height sections, traveling upwardly along the pocket slope to bind against the ring steps. In clutch operation, the hub interior and exterior sections are thereby connected at multiple points therearound, equally distributing the applied torque through as many as ten ball bearings.

For carrying axial loads that are parallel to the road surface and are transmitted through the axle, the invention can include at least one thrust bearing fitted between the hub interior and exterior sections that includes a pair of like disk shaped plates that are fitted together and have radially spaced cylindrical openings that align as pairs to each receive a needle bearing journaled therein. In the invention, applied radial and axial loads are supported by the combination of ball and needle bearings that operate in conjunction with standard roller bearings as are fitted between a stationary axle and support the hub whereto a rim is mounted, as through spokes, or like arrangement.

It is a principal object of the present invention to provide a hub clutch bearing assembly that provides for a nearly instantaneous coupling of hub inner and annular sections across ball bearings for transferring torque from the hub inner section to the outer section whereto a wheel rim is secured.

Another object of the present invention is to provide a wheel hub clutch consisting of inner and outer hub sections, with the inner section for mounting to an axle that is turned by a peddle arrangement to transfer torque thereto, and with the inner section including a ring having spaced contoured pockets formed therearound that are each fitted with a ball bearing, and with the hub outer section including an annular ring having spaced steps sections, and with each ball bearing to nest and bind between a pocket surface and a ring step, transferring torque thereacross.

Another object of the present invention is to provide the inner ring with contoured pockets that slope upwardly from a deep section in the direction of wheel turning, whereby each ball bearing, at peddle turning, will roll oppositely to the direction of peddle turning, traveling upwardly along the pocket contour and into engagement with an adjacent ring step, causing the ball bearing to bind therebetween, transferring torque from turning the peddle arrangement into the turning hub outer section.

Another object of the present invention is to provide a wheel hub that will present a minimum rolling resistance in a free-wheeling mode and includes a clutch that will nearly instantly and positively connect to transmit torque when a peddle arrangement is turned, and will quickly disengage when a peddle turning force is removed.

Another object of the present invention is to provide a wheel hub clutch where engagement of hub inner and outer sections is through a plurality of ball bearing where the ball bearings each turn between engagements and thereby preclude scuffing of the ball surface over time and repeated couplings.

Still another object of the present invention is to provide a wheel hub where hub inner and outer section coupling is through ball bearings for supporting road forces as are directed perpendicularly into the hub, with the hub further including at least one thrust bearing fitted between the hub sections for supporting side or axial loads.

Still another object of the present invention is to provide a thrust bearing that consists of needle bearings that are mounted radially in a disk shaped body that is open through its center to receive an axle fitted therethrough, with the thrust bearings to support side or axial loads as are directed into the hub.

Still another object of the present invention is to provide a wheel hub clutch that is simple and economical to manufacture and will provide a sure and nearly instantaneous engagement to transfer torque, as from a turning peddle arrangement, to turn a wheel whereto the hub is mounted

BRIEF DESCRIPTION OF THE DRAWINGS

These and other objects and features of the present invention will become more apparent from the following description in which the invention is described in detail in conjunction with the accompanying drawings:

FIG. 7 shows a front end and side perspective view of a mountain bicycle having a gear operated peddle and chain torque transfer arrangement that the wheel hub of the invention is suitable for installation on.

DETAILED DESCRIPTION

The invention, as is hereinafter described, relates to wheel hubs that remain unengaged or free-wheeling during a coasting mode where, torque is not being applied to turn the wheel in a clockwise direction, and includes a clutch that will immediately engage to transfer torque from a clockwise turning of the hub inner portion or section, for transferring torque across the hub and into the wheel mounted onto the hub.

Figure 1:
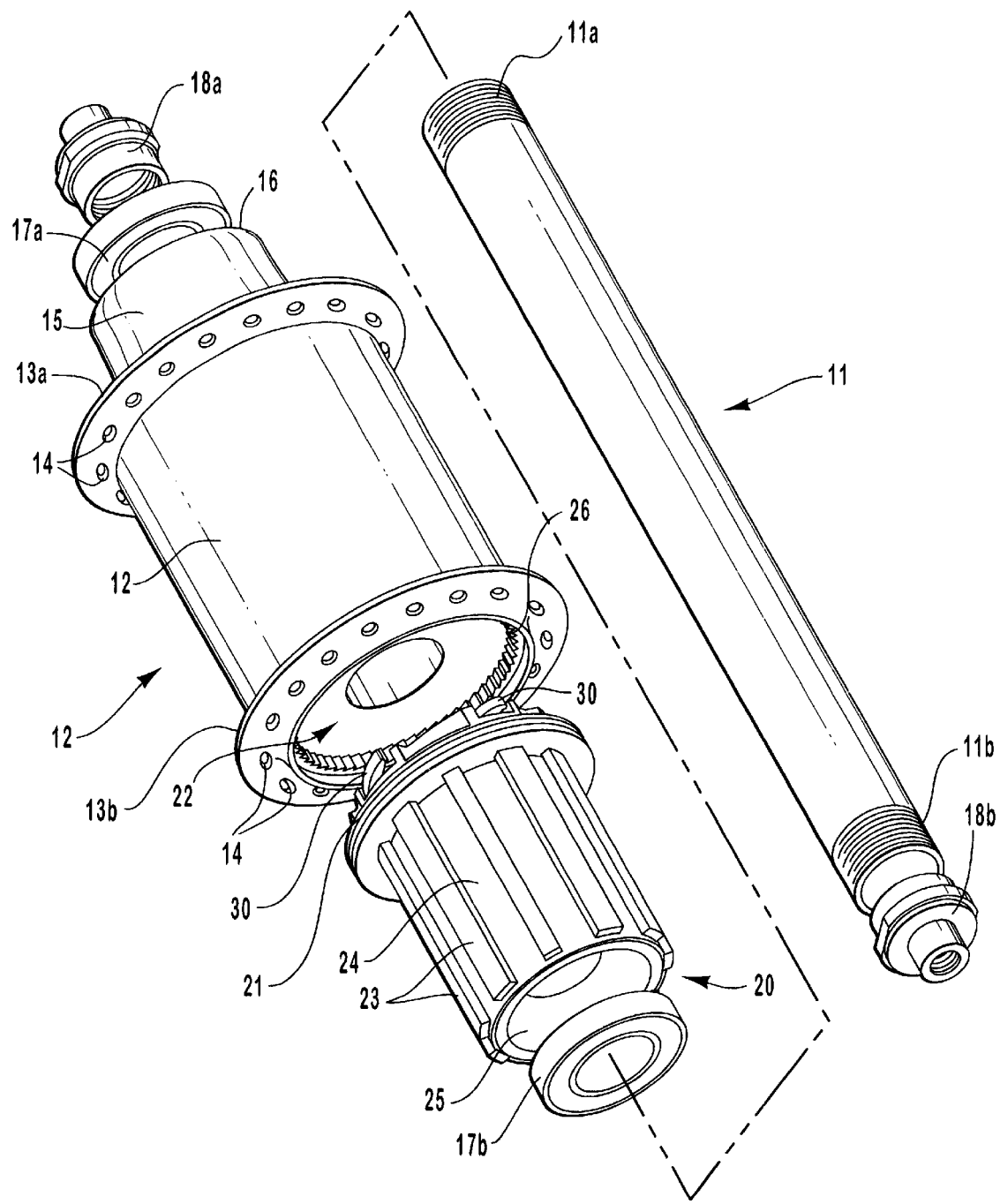
FIG. 1 is a side and end elevation exploded perspective view of a hub and axle that is identified as Prior Art.
Figure 7:
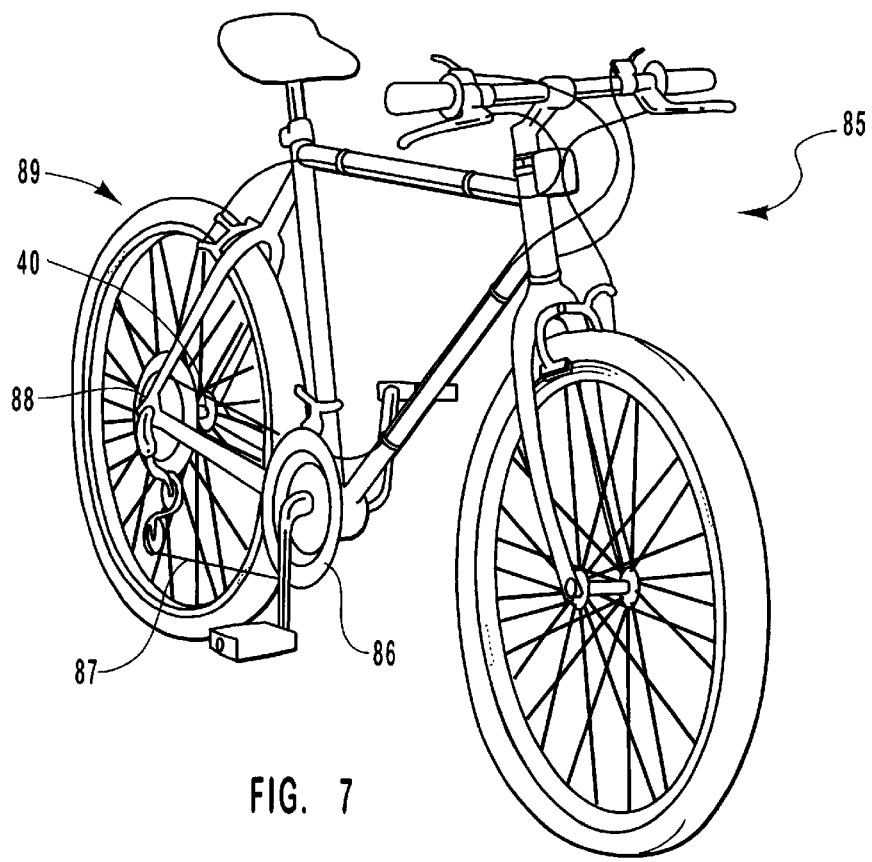
Figures 8A, 8B:
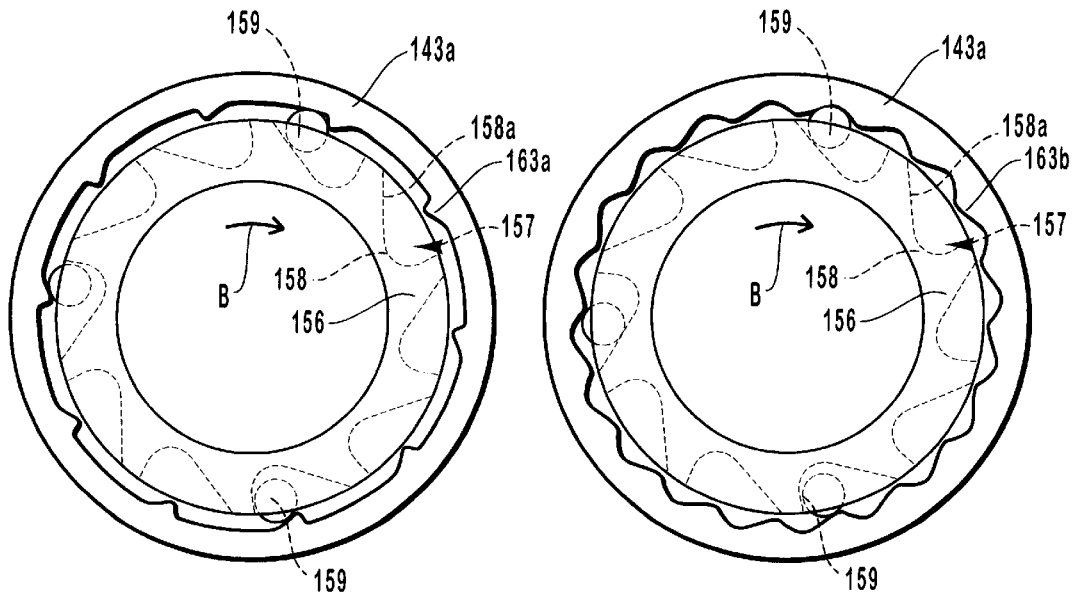
FIGS. 8A, 8B, 8C and 8D are views like that of Gigs. 6A, 6B and 6C only showing alternative arrangements of the hub out section stepped portions.
Figures 8C, 8D:
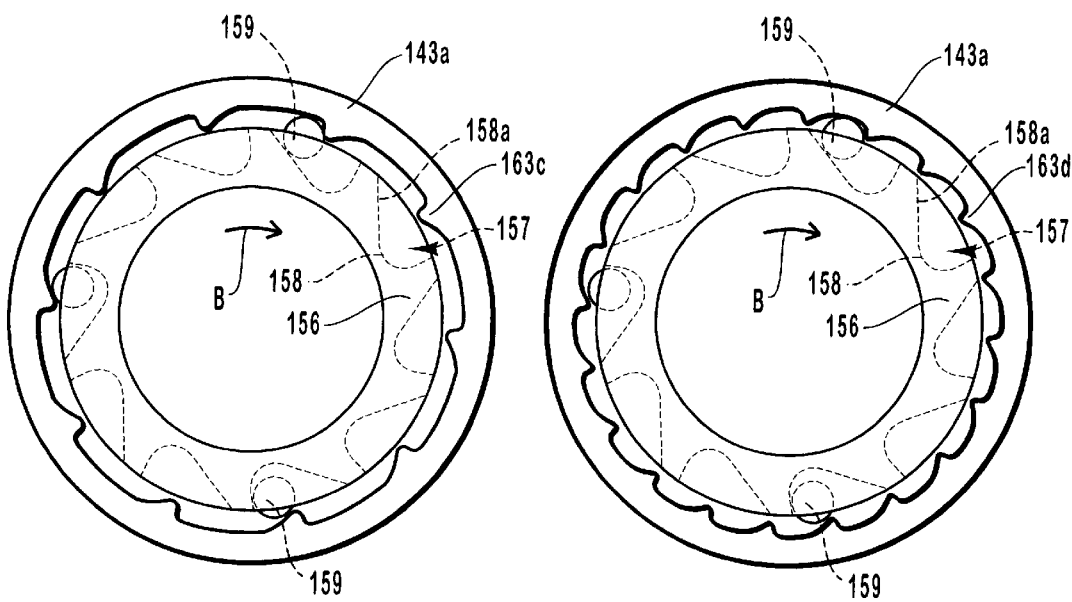

FIG. 1 shows an exploded perspective view of a hub 10 and axle 11 that is identified as Prior Art and is here included to illustrate what has been and is currently a market standard of a wheel hub with clutch. Shown in FIG. 1, the hub 10 includes a center sleeve 12 that has up-turned flange ends 13a and 13b that each have spaced holes 14 formed therearound to receive ends of spokes, not shown, fitted thereto to form a wheel, such as a bicycle wheel like the wheel 89 that is shown fitted to a bicycle 85, as shown in FIG. 7. Shown in FIG. 1, the hub center sleeve 12 is stepped inwardly from flange end 13a into a collar 15 having a flat outer end 16 that is open and is itself stepped to receive and seat a roller bearing 17a fitted therein. The roller bearing 17a is open across its center to receive axle 11 that has traveled through the center sleeve 12 and is fitted therethrough, with the axle end 11a to receive an end cap 18a turned thereover. A gear spline sleeve 20 clutch end 21 is shown aligned to fit into a driver end 22 of sleeve 12, as shown best in FIGS. 2A and 2B, and as is discussed hereinbelow. The gear spline sleeve 20 includes like parallel spaced bars 23 that are fixed longitudinally to the sleeve outer surface 24 and are to receive the contours of the open center of gears fitted thereover as a stack, with a greatest diameter gear preferably arranged closest to the sleeve 12 flange end 13b. A standard bicycle chain, like chain 87 of FIG. 7, is fitted over one of the gears. In operation, the chain 87 of FIG. 7 is moved across the gears, changing the speed of turning of the hub 10 and connected wheel responsive to operation of a derailer assembly. The hub 10 is assembled by fitting the axle 11 through a center opening formed through roller bearing 17b that, in turn, is fitted in an outer opening 25 of the gear spline sleeve 20. The axle 11 is passed through the gear spline sleeve 20, center sleeve 12, that includes the collar 15, and through the roller bearing 17a, and is to receive the cap 18a turned thereover. A cap 18b, that is like cap 18a, is turned over the axle end 11b, finishing the assembly of the hub 10 and axle 11 that is then installed to a bicycle frame as the rear wheel.

Figure 2A:
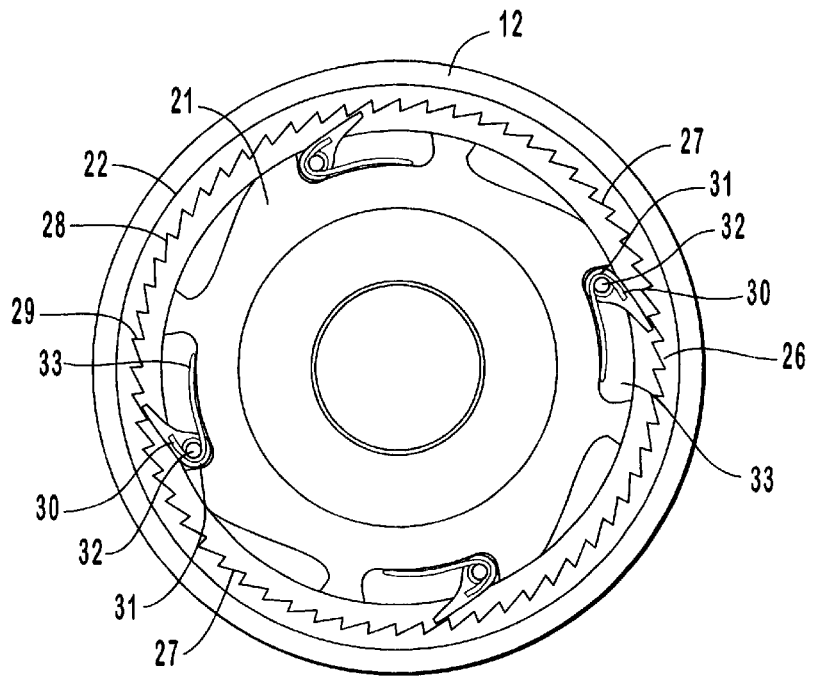
FIG. 2A is an end sectional view of the assembled hub of FIG. 1 taken across a hub coupling end showing spring biased pawls ratcheting over teeth apexes of a hub outer portion annular ring section when the hub is free-wheeling, and the peddle assembly is not being turned to produce a drive torque.
Figure 2B:
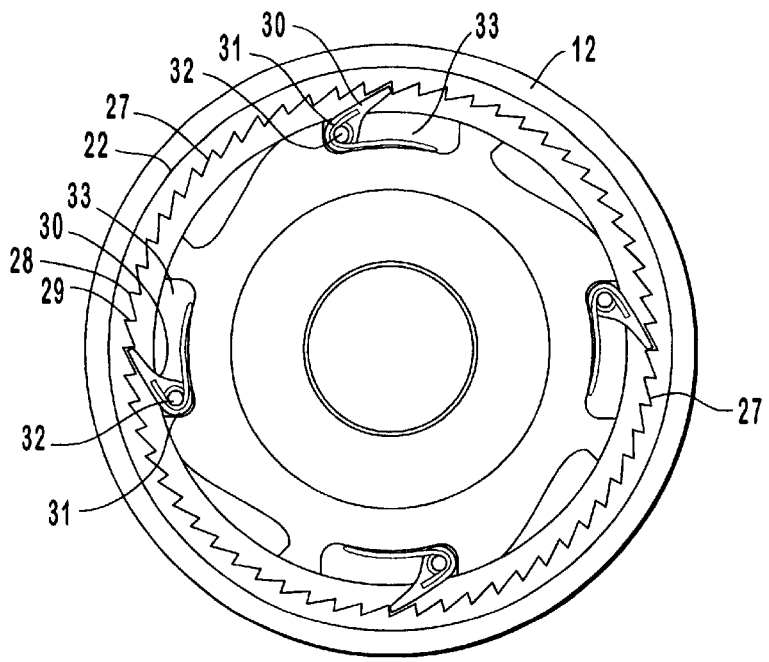
FIG. 2B is a view like that of FIG. 2A showing the pawls in engagement with the sides of the annular ring teeth when the peddle assembly is turned by an operator, producing a drive torque.

The hub 10, is assembled as described above, to provide a spring actuated ratchet such that, as shown in FIGS. 2A and 2B, and includes an annular ring that is formed with identical spaced teeth 26, as shown in FIG. 1, that are secured to the inner surface of the sleeve 12, adjacent to the sleeve flange end 13b. Shown in FIGS. 2A and 2B. each tooth 27 of teeth 26 slopes uniformly outwardly from a based end 28 to an apex wherefrom a flat face 29 extends downwardly. The teeth 26 oppose a number of spaced pawls 30 that are fitted in slots 33 and are spaced to be equidistant from one another and to extend outwardly from around the outer surface of the gear spline sleeve 20 clutch end 21, as shown in FIG. 1. The pawls 30 are each fitted into a slot 33, and a base end of each pawl is mounted at a pivot 32 so as to extend outwardly, under the biasing of sear springs 31, as shown in FIGS. 2A and 2B. So arranged, with a wheel mounted to the hub sleeve 12 turning clockwise in a freewheeling attitude, as illustrated in FIG. 2A, each pawl 30 rides up each tooth 27, extending down the tooth face 29 to engage the next tooth 27 base end 28, with the pawls 30 thereby ratcheted along the teeth 26. When, however, the gear spline sleeve 20 is turned clock-wise, as by action of the bicycle chain 87 acting through one of the gears splined thereon during operation of the bicycle peddle assembly, the pawls 30 outer ends each engage a tooth 27 face 29, as shown in FIG. 2B, locking the gear spine sleeve 20 to the hub sleeve 12, to transfer torque from the peddle assembly to the bicycle wheel.

Figure 3:
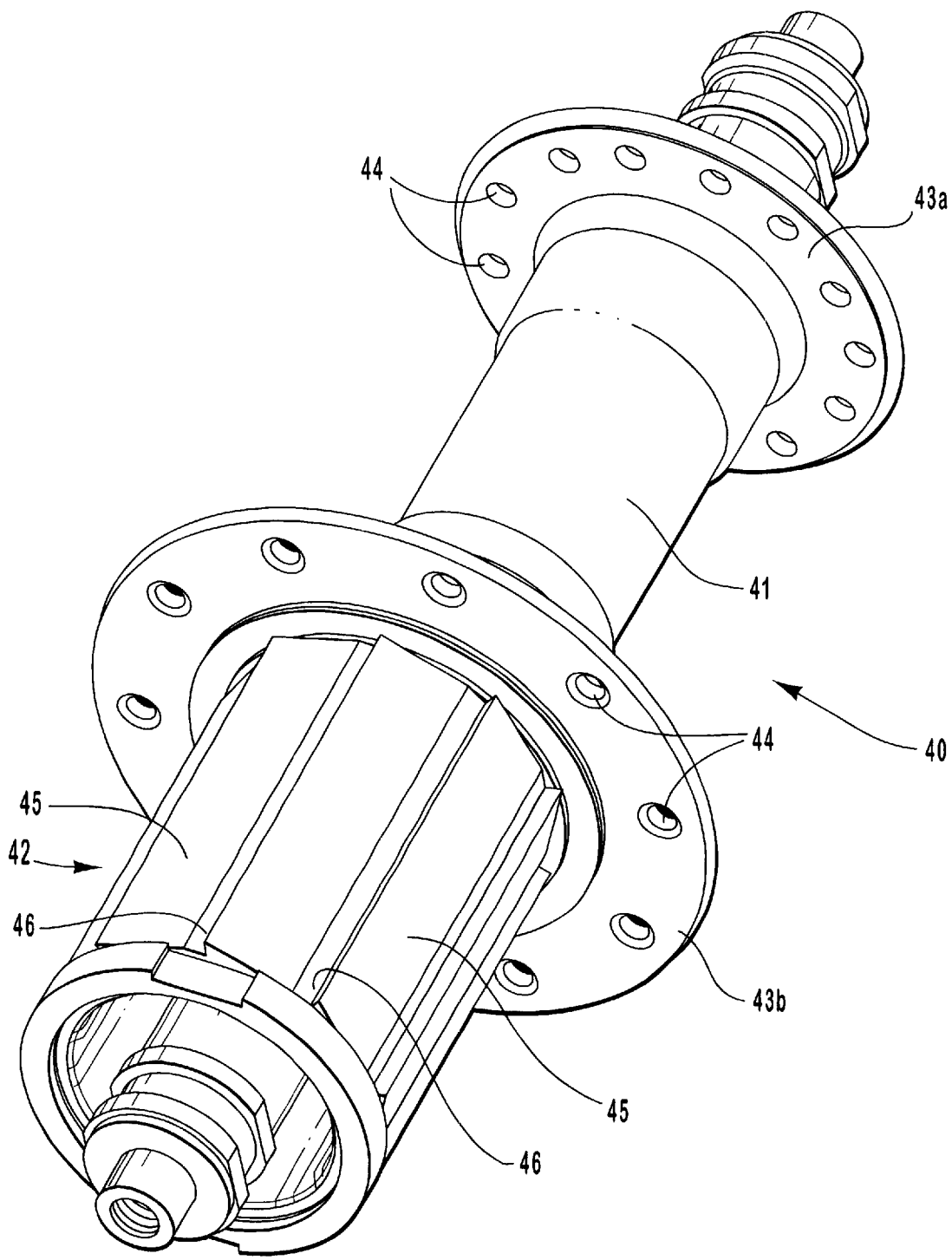
FIG. 3 is a side elevation perspective view of a hub of the invention shown arranged as a bicycle hub that includes spoke holes that are for securing spoke ends therein.

Like the described torque transferring hub 10, the invention is in a torque transferring hub 40, hereinafter referred to as hub that operates as a clutch for transferring torque into a wheel that the hub is part of. Such torque is generally passed through a chain drive to a gear, illustrated as chain 87 and gears 88 in FIG. 7. Which gear or gears 88 are splined onto a gear spline sleeve 42 that connects, end to end, to a center sleeve 41 whereto ends of wheel spokes are fitted at spaced intervals to extend from around the center sleeve, as shown in FIG. 5. In outer appearance, the hub 40, as shown in FIG. 3, has an appearance that is similar to the prior art hub 10. Shown best in FIG. 4, the hub 40 includes a center sleeve 41 with ends wherefrom flange plates 43a and 43b extend outwardly and are essentially parallel and include, respectively, holes 44 formed at spaced intervals therethrough that are for receiving spoke ends, forming a wheel like the rear wheel 89 of the bicycle 85 of FIG. 7. An axle 45, that is threaded on its ends 45a and 45b, is for fitting through, to hold together, the hub 40 components and to mount the hub 40 to a bicycle rear frame. End caps 46a and 46b are provided that are turned onto the axle threaded ends 45a and 45b to hold the hub 40 together, as set out herein with respect to a description of the assembly of hub 40.

Figure 4:
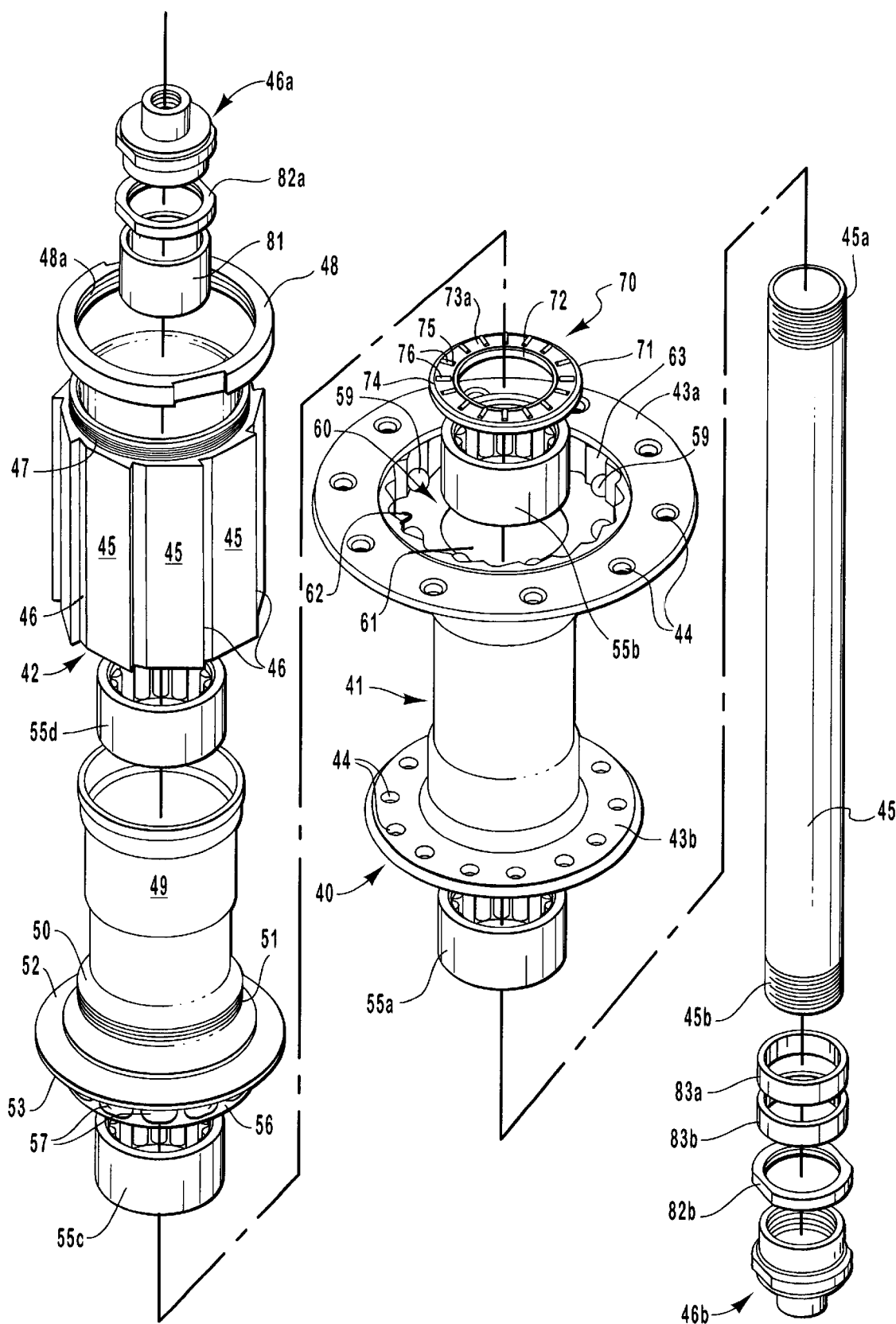
FIG. 4 is a side elevation exploded perspective view of the hub of FIG. 3.
Figure 5:
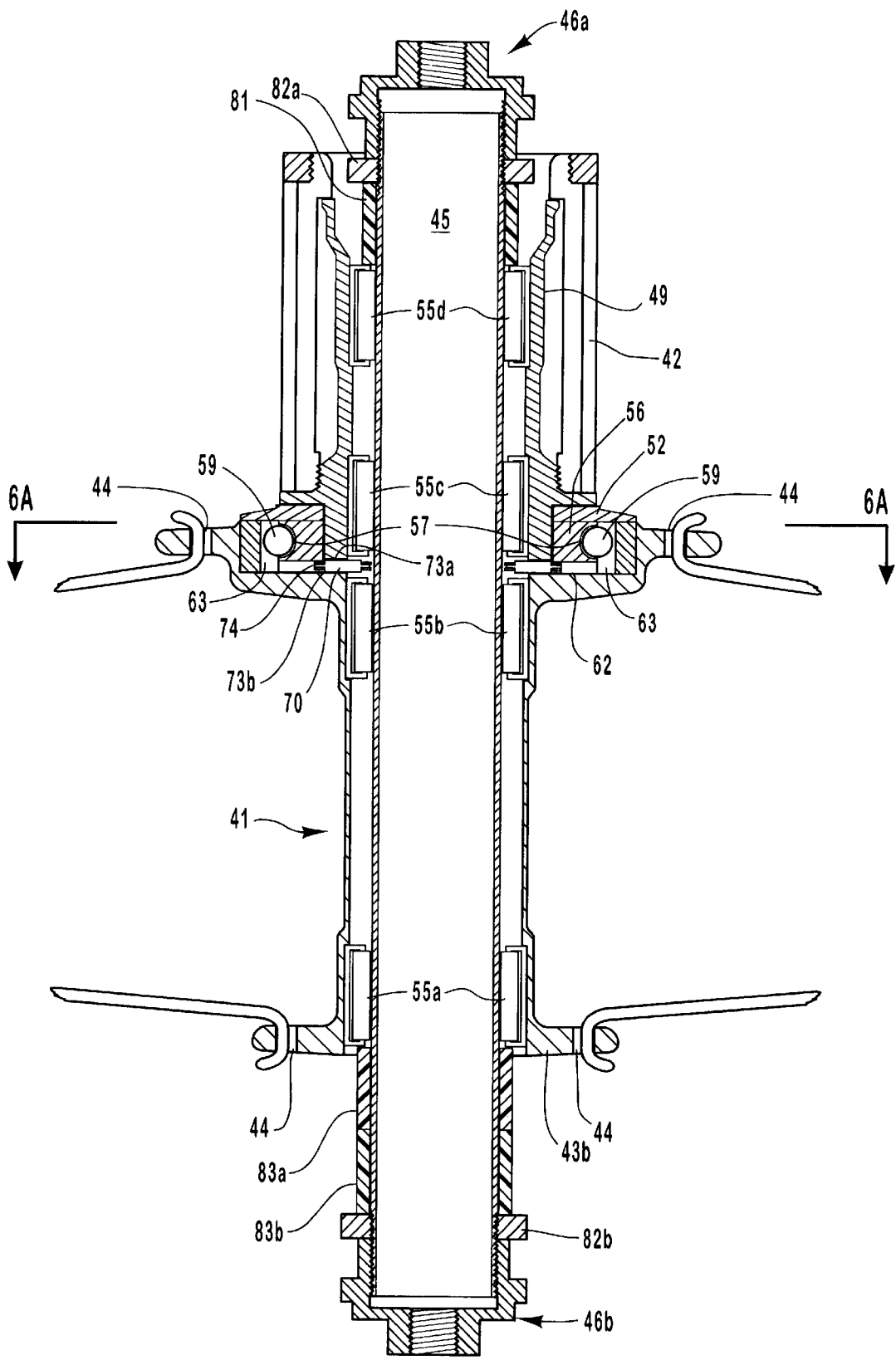
FIG. 5 is a longitudinal sectional view of the hub of FIG. 3, shown as having been assembled and whereto spokes have been attached to form a wheel, such as a bicycle wheel, showing the hub axle supported to the hub between pairs of conventional roller bearing and showing the hub clutch as including inner and outer annular sections, with roller bearings fitted in contoured pockets or the hub inner section and to engage adjacent to stepped portions of an annular ring of the hub outer section, and showing the hub clutch sections separated by a thrust bearing.

Shown in the exploded view of FIG. 4, and the assembled longitudinal sectional view of FIG. 5, the hub 40 of the invention, like the hub 10, is for fitting onto axle 45. The hub includes the gear spline sleeve 42, that has parallel longitudinal spaced bars 45 projecting outwardly from around a sleeve cylindrical outer surface 46. Which the spaced bars 45 each have a right triangular cross section to accommodate a center hub configuration of at least one, and preferably a stack, of driven gears, like the stack of gears 88 of the bicycle 85, as shown in FIG. 7. The gear spline sleeve 42, shown in FIG. 4, is open therethrough and includes, on an upper end, a threaded end collar 47 for receiving and mounting a ring 48 that is internally threaded at 48a for turning thereover to maintain gears 88 on the gear spline sleeve 42. The collar 50 is fixed to one end section of an axle bearing sleeve 49, just back from a flat circular disk 52 that is treaded to receive an internally threaded lower end of the gear spline sleeve 42 turned thereon. The flat circular disk 52 includes inner face 53 that contains one of two sides of a torque transfer clutch of the invention, as set out below. The axle bearing sleeve 49 is stepped internally at opposite ends to receive standard roller bearings 55c and 55d, to be fitted therein that are open across their centers to allow passage to and to support the axle 45 fitted therethrough, as shown in FIG. 5.

Shown in FIG. 4, the assembled view of FIG. 5, and FIGS. 6A, 6B and 6C, the axle bearing sleeve 49 end that is adjacent to the flat circular disk face 53 is a thick ring 56 having a series of like contoured pockets 57 formed around its outer surface. Each pocket 57 has a forward pocket section 58 formed to seat a ball bearing 59 therein and tapers upwardly from the forward pocket section 58 as a track 58a that the ball bearing 59 will roll along from forward pocket section 58. So arranged, the ball bearings 59 will travel outwardly along the track 58a, when the thick ring 56 is turned in a clock-wise direction. Which turning is provided by a turning of the gear spline sleeve 42 that is turned by a turning of a gear that is splined thereon and whereover a chain, like the chain 87 shown in FIG. 7, is fitted.

Shown in FIG. 4, the center sleeve 41 flange plate 43a, wherein spaced holes 44 are formed that receive ends of spokes fitted thereto, includes a center cup section 60 that is open across a bottom end into an axle passage 61. The center cup section 60 has an adjacent wall 62 that is parallel to the flat circular disk 52 thick ring 56 face, and, when the hub 40 is assembled, will function as the other of the two sides containing the torque transfer clutch of the invention. The center cup section, shown in FIG. 4 and FIGS. 6A, 6B and 6C, includes a series of like spaced ring steps 63 as an outside wall 62 of the center cup section 60, and provides a center sleeve 41 annular ring that opposes the contoured pockets 57 of the assembled hub 40. A plurality of ball bearings 59 are shown fitted into the spaced ring steps 63 as they would be positioned when the clutch is engaged to transfer torque therethrough.

In the assembly view of FIG. 5, the ball bearings 59 are shown fitted into so as to span between the contoured pockets 57 and the ring steps for locking the gear spline sleeve 42 and center sleeve 41 together, transferring torque into the wheel mounted onto the center sleeve 41. This locked state of the gear spline sleeve 42 and center sleeve 41 continues until torque is removed from the gear spline sleeve 42 as when an operator discontinues turning the peddle arrangement with their feet, and allows the wheel 89 to free-wheel. In which free-wheeling, the wheel 89 continues turning in the direction of gear spline sleeve 42 turning, with the ball bearings 59, when not under torque, tending to roll away from the ring steps 63, along the contoured pockets 57 sloping tracks 58a and back into pocket forward sections 58. Which ball bearing 59 travel disengages torque transfer and is essentially immediate when the operator discontinues peddle turning. Likewise, hub 40 engagement is essentially immediate when an operator turns the peddle arrangement to pass the chain 87 around the gear that is connected to the gear spline sleeve 42. It is the gear spline sleeve 42 turning causes the ball bearings 59 to roll back along the contoured pockets 57 sloping tracks 58a and into engagement with engage a ring step 63. As the ball bearings 59 tend to roll in the contoured pockets during free-wheel the engaging surfaces of each of the ball bearings will vary between each engagement, avoiding ball scoring at points of scuffing as has occurred with earlier systems, greatly extending unit life.

Figure 6A:
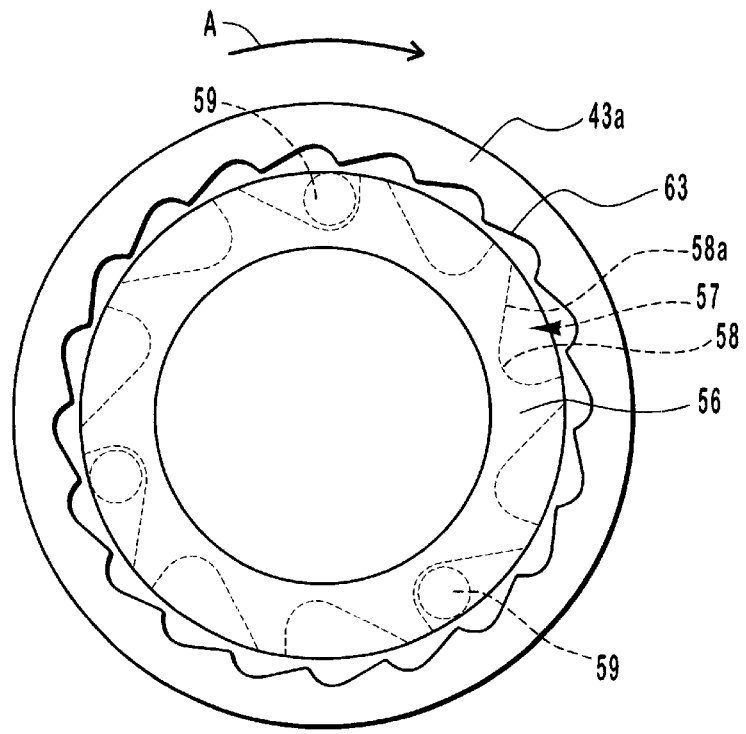
FIG. 6A is an enlarged end sectional view taken along the line 6A—6A of FIG. 5, showing the assembled clutch load bearing and torque transfer system in a free-wheeling attitude.

FIG. 6A shows the hub 40 in a free-wheeling attitude, the flange plate 43a of the center sleeve 41 turning as illustrated by arrow A, as when the bicycle 85 is coasting and the peddle assembly 86, shown in FIG. 7, is not turning. So arranged, gear spline sleeve 42, whereto is connected the thick ring 56 with the spaced contoured pockets 57 formed therein, is stationary, and the ball bearings 59 rest in the contoured pockets forward sections 58.

Figure 6B:
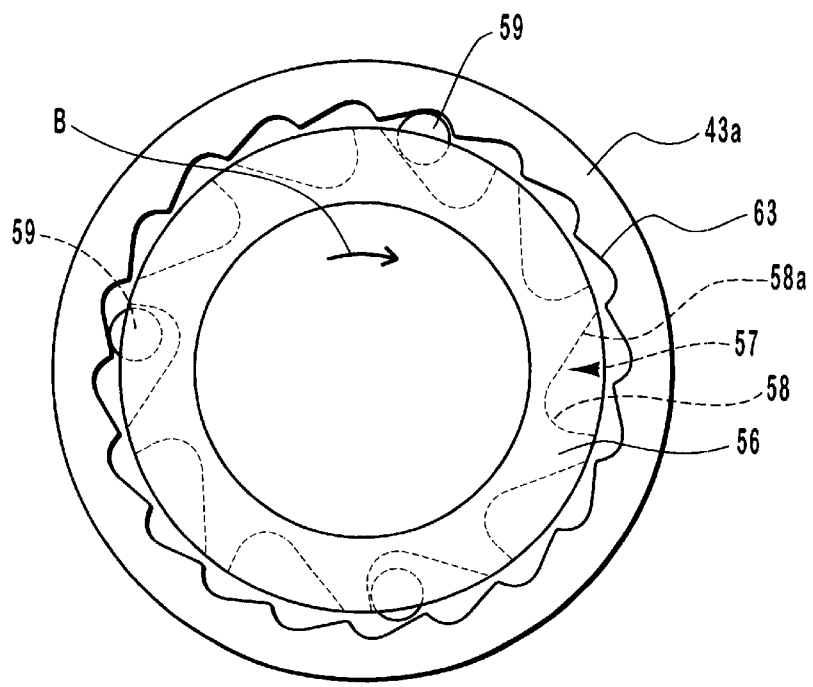
FIG. 6B is a view like that of FIG. 6A showing the roller bearings in the hub inner section pockets as having been moved outwardly, responsive to axial turning, and have traveled along the pocket tracks into engagement with the stepped portions of an annular ring of the hub outer section.

FIG. 6B shows the hub 40 of FIG. 6A with arrow B indicating a turning of the gear spline sleeve 42 as through chain 87, that is linked to the peddle assembly 86 of the bicycle 85 of FIG. 7. Which gear spline sleeve 42 is turned, as indicated by arrow B, in the direction of wheel rolling, shown as arrow A in FIG. 6A, and causes the ball bearings 59 to roll oppositely to the direction of turning, traveling upwardly along the sloping tracks 58a to contact a ring step 63 surface. Which ball bearing 59 travel is a very short distance providing essentially an immediate coupling of the respective gear spline sleeve 42 and center sleeve 41 of the flange plate 43a to transfer an applied torque thereacross and turn the wheel 89, shown in FIG. 7.

Figure 6C:
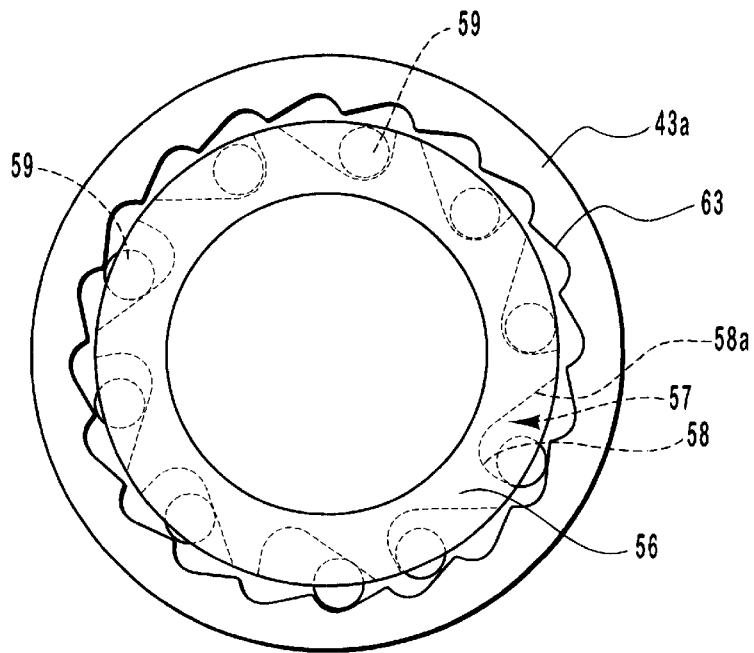
FIG. 6C is a view like that of FIG. 6B showing the roller bearings as having fully moved into binding engagement between the hub inner section pockets and the hub outer section stepped portions, transferring an applied torque thereacross.

FIGS. 6A and 6B show the cavity between gear spline sleeve spaced pockets 57 and ring step 63 surface as accommodating three ball bearings 59. Whereas, FIG. 6C shows ten ball bearings 59, arranged one in each gear spline sleeve contoured pocket 57. The FIGS. 6A, 6B and 6C to illustrate that as few as three and as many as a ball bearing for each pocket 57 can be so used to provide for rapid and sure locking together and separation of the gear spline sleeve 42 of the flange plate 43a and center sleeve 41 for transferring torque from a peddle assembly into a wheel.

Additionally, where FIGS. 6A, 6B and 6C all show the gear spline sleeve 42 as including the ring step 63 surface, FIGS. 8A, 8B, 8C and 8D are hee included to illustrate other surface configurations of the center sleeve 42 that can be utilized with the described gear spline sleeve contoured pockets, within the scope of this disclosure. Shown in the side elevation view of FIGS. 8A, 8B, 8C and 8D, a flange plate 143a has center sleeve surfaces 163a, 163b, 163c and 163d that are opposed, respectively, by gear spline sleeve contoured pockets 157. Which gear spline sleeve contoured pockets 157 are each formed in thick ring 156 that, respectively, include forward pocket sections 158 that each slope upwardly at 158a so as to accommodate ball bears 159, as shown in broken lines. The center sleeve surfaces 163a, 163b, 163c and 163d, respectively, illustrate alternative surface configuration to the ring steps 63 of FIGS. 6A, 6B and 6C, and are herein includes as examples of alternative surfaces capable of engaging and binding to the surface of a ball bearing as is contained in a contoured pocket 57 or 157, of FIGS. 6A, 6B and 6C and 8A, 8B, 8C and 8D. Thereby illustrating that the center sleeve surface can be any appropriate surface within the scope of this disclosure.

The above set out description of the components of and function of the hub clutch of the invention for providing a rapid coupling and uncoupling the gear spline sleeve 42 and center sleeve 41 provides for a transfer of road forces as are perpendicular to the road surface. Additionally, the hub 40, for minimizing friction as is directed through the axle 45, and are essentially perpendicular to road forces, preferably includes a thrust bearing 70, as shown best in FIGS. 4 and 5, that is installed in the center sleeve 41 center cup section 60. The preferred thrust bearing 70, as shown, has a thin disk shaped body 71 that is open across a center opening 72 to align with the axle opening 61, and with one flat side of the thrust bearing body 71. As shown best in FIG. 5, the thrust bearing 70 is arranged to fit against roller bearing 55b and contact, around its outer section, the wall 62 of the center cup section 61, adjacent to a cavity wherein the roller bearing 55b is seated. Which thrust bearing 70 body 71 other flat side is in contact with roller bearing 55c that is seated in the gear spline sleeve 42 end wherein the thick ring 56 is fitted. So arranged, as shown in FIGS. 4 and 5, the thrust bearing 70 includes the thin disk shaped body 71 having center opening 72 therethrough and, in practice, is preferably formed as a sandwich of like front and rear plates 73a and 73b, that are maintained in spaced relationship by both an outer ring 74 and an inner ring wherethrough the center opening 72 is formed, and which front and rear plates each include radial slots 75. The radial slots 75 are aligned, with each set of aligned slots providing an opening thereacross wherein is journaled a needle bearing 76 that is supported to turn freely therein. So arranged, the described ball bearing clutch 40 provides the described rapid and smooth engagement to transfer torque from a gear or gears splined onto the gear splined sleeve 42 and disengagement, and the thrust bearing 70 minimizes turning friction between the center sleeve 41 gear splined sleeve 42, to efficiently handle axial loads directed therein. While the invention preferably consists of the described hub clutch and thrust bearing arrangement, it should be understood, that the described hub clutch can be used without the thrust bearing 70 within the scope of this disclosure. Also, while the ring steps 63 have been set out herein as a preferred surface for engaging the ball bearings 59 as have traveled outwardly along the sloping track 58a, as described above, other surfaces, such as a scored surface, one with spaced lateral bars or depressions thereacross, or the like, can be so used, within the scope of this disclosure, as illustrated in FIGS. 8A, 8B, 8C and 8D, and even a smooth surface could be so used as substitute for the described ring steps 63. Therefore, in practice, it should be understood, any appropriate surface can be so used in addition to the ring steps 63 to provide a surface whereto the ball bearing 59 surface will engage, and bind against, to lock the respective gear splined sleeve 42 and center sleeve 41 together for transferring torque transmitted into the gear splined sleeve 42.

As shown best in FIGS. 4 and 5, the hub 40 additionally includes a gear splined sleeve spacer 81 that is fitted over axle 45 and is held in place by lock ring 82a, provides for holding bearing 55d in place, and the center sleeve is shown as including a pair of spacers 83a and 83b that are fitted over axle 45 and includes a lock ring 82b fitted thereto to urge the spacers into the center sleeve end, adjacent to the flange 43b. End caps 46a and 46b are shown turned over the axle 45 threaded ends 45a and 45b, for holding the components together, completing the hub 40 assembly.

The hub 40, as set out above, is suitable for inclusion with a geared or direct drive bicycle, or the like, and a geared bicycle 85 is shown in FIG. 7 as an example of such bicycle. The bicycle 85, as shown, includes a peddle arrangement 86 that is turned to move a chain 87 across one of a stack of gears 88 as are spline fitted over hub 40, turning bicycle wheel 89. Though, it should be understood, another bicycle configuration, other vehicle or machine that is driven as by turning of a peddle arrangement, or the like, could include the hub 40 of the invention, within the scope of this disclosure.

Hereinabove has been set out a description of wheel hub that includes a clutch of the invention that is useful on any vehicle or assembly where a torque is transfered through the hub clutch to turn a wheel, or the like. It should, however, be understood that the present invention can be varied within the scope of this disclosure without departing from the subject matter coming within the scope of the following claims, and a reasonable equivalency thereof, which claims we regard as our invention.

We claim:

1. A hub with clutch comprising, a hub body including a first sleeve that includes a means for mounting a driven gear thereon, and a second sleeve that includes means for arrangement as a wheel hub; a hub clutch arranged between said first and second sleeves including of a ring section fitted onto an end of said first sleeve and includes identical spaced pockets formed at equal spaced intervals around and into said ring section outer surface, with each said pocket including a deep forward section formed to accommodate a ball bearing fitted therein and each said pocket includes an outwardly sloping surface extending from said forward section to, or near to, said ring section surface, and an end of said second sleeve includes an annular ring section that is adjacent to a cavity wherein said ring section is fitted such that, when said hub is assembled, said spaced pockets oppose an outer surface of said annular ring section, and including ball bearings contained in said pockets to roll from said pocket along said pocket outwardly sloping surface to engage and bind against said annular ring section surface, and with said first and second sleeves including center passages that align to receive bearings for fitting therein that receive an axle fitted through center openings of said bearings; and a straight axle for fitting through said bearings center openings and including coupling means for fitting onto ends of said straight axle for mounting to a frame.

2. The hub with clutch as recited in claim 1, further including a thrust bearing for installation on the axle between the first and second sleeves that has a disk shaped body that is open through its center to receive said axle, which said body is formed from a pair of like flat disks that each have spaced radial slots formed therein that are aligned to receive needle bearings journaled therein, and including means for maintaining said pair of like flat disks together.

3. The hub with clutch as recited in claim 2, wherein the thrust bearing is fitted into a cavity formed in the ring section around the center passage formed therethrough, and is sandwiched between the bearings that are fitted, respectively, in the first and second sleeve abutting ends.

4. The hub with clutch as recited in claim 1, wherein the spaced pockets are identical and each has a cup shape, with said pocket opening to an upwardly sloping surface that extends oppositely to the direction of the ring section when the wheel is rolling forward; and the annular ring section outer surface includes steps formed at spaced intervals therearound for capturing a ball bearing surface as has traveled along the pocket outwardly sloping surface.

5. The hub with clutch as recited in claim 1, further including bearings formed to receive the axle fitted therethrough that each include an outer race of a diameter to fit in cavities formed in the first and second sleeves ends.

6. The hub with clutch as recited in claim 1, wherein the first sleeve includes as the means for mounting a driven gear thereon, a plurality of spaced raised longitudinal sections formed around the first sleeve exterior surface that receive a center opening of each gear to allow each said gear to slide over said spaced raised sections and lock thereon.

7. A hub with clutch comprising, a hub body including a first sleeve that includes a means for mounting a driven gear thereon, and a second sleeve that includes means for arrangement as a wheel hub; a hub clutch arranged between said first and second sleeves including of a ring section fitted onto an end of said first sleeve and includes identical spaced pockets formed at equal intervals around and into said ring section outer surface, with each said pocket including a forward section formed to have a size and shape to accommodate a ball bearing fitted therein and each said pocket includes an outwardly sloping trough type surface extending from said forward section to, or near to, said ring section surface, and an end of said second sleeve includes an annular ring section located adjacent to a cavity wherein said ring section is fitted such that, when said hub is assembled, said spaced pockets oppose an outer surface of said annular ring section that includes means for providing a friction surface thereto whereby ball bearings contained in said pockets can roll along said pocket outwardly sloping trough type surface to engage said annular ring section friction surface, and said first and second sleeves include center passages that align to receive bearings fitted therein that receive an axle fitted through center openings that are formed through said bearings; and a straight axle for fitting through said bearings center openings and including coupling means for fitting onto ends of said straight axle for mounting to a frame.

8. The hub with clutch as recited in claim 7, further including a thrust bearing for installation on the axle between the first and second sleeves that has a disk shaped body that is open through its center to receive said axle, which said body is formed from a pair of like flat disks that each have spaced radial slots formed therein that are aligned to receive needle bearings journaled therein, and including means for maintaining said pair of like flat disks together.

9. The hub with clutch as recited in claim 8, wherein the thrust bearing is fitted into a cavity formed in the ring section around the center passage formed therethrough, and is sandwiched between the bearings that are fitted, respectively in the first and second sleeve abutting ends.

10. The hub with clutch as recited in claim 7, wherein the spaced pockets are identical and each has a cup shape, with said pocket opening to and upwardly sloping surface that extends oppositely to the direction of the ring section turning when the wheel is rolling forward; and the annular ring section other surface includes steps formed at spaced interval therearound as the friction surface for capturing a ball bearing surface as has traveled along the pocket outwardly sloping surface.

11. The hub with clutch as recited in claim 7, further including bearings formed to receive the axle fitted therethrough that each include an outer race of a diameter to fit in cavities formed in the first and second sleeves ends.

12. The hub with clutch as recited in claim 7, wherein the first sleeve includes a plurality of spaced raised sections formed as spaced longitudinal sections formed around the first sleeve exterior surface that are to receive one or more gears, each having a center opening to slide over said spaced raised sections, each said gear and lock thereon.

13. A hub with clutch comprising, a hub including a first sleeve that includes a means for mounting a driven gear thereon, and a second sleeve that includes means for arrangement as a wheel hub; a hub clutch arranged between said first and second sleeves including a ring section fitted onto an end of said first sleeve and includes identical spaced pockets formed at equal spaced intervals around and into said ring section outer surface, with each said pocket including a deep forward section formed to accommodate a ball bearing fitted therein and each said pocket includes an outwardly sloping surface extending from said forward section to, or near to, said ring section surface, and an end of said second sleeve includes an annular ring section adjacent to a cavity wherein said ring section is fitted such that, when said hub is assembled, said spaced pockets oppose an outer surface of said annular ring section whereby ball bearings contained in said pockets can roll along said pocket outwardly sloping surface and engage, to bind against, said annular ring section surface, and said first and second sleeves include center passages that align to receive bearings fitted therein that receive an axle fitted through center openings of said bearings; a bearing means fitted between said first and second sleeves for minimizing load forces directed across said first and second sleeves; and a straight axle for fitting through said bearings center openings and includes coupling means for fitting onto ends of said straight axle for mounting to a frame.

14. The hub with clutch as recited in claim 13, wherein the bearing means fitted between the first and second sleeves is a thrust bearing for installation on the axle between said first and second sleeves that has a disk shaped body that is open through its center to receive said axle, which said body is formed from a pair of like flat disks that each have spaced radial slots formed therein that are aligned to receive needle bearings journaled therein, and including means for maintaining said pair of like flat disks together.

15. The hub with clutch as recited in claim 14, wherein the thrust bearing is fitted into a cavity formed in the ring section around the center passage formed therethrough, and is sandwiched between the bearings that are fitted, respectively, in the first and second sleeve abutting ends.

16. The hub with clutch as recited in claim 13, wherein the spaced pockets are identical and each has a cup shape, with said pocket opening to an upwardly sloping surface that extends oppositely to the direction of the ring section when the wheel is rolling forward; and the annular ring section outer surface includes steps formed at spaced intervals therearound for capturing the surface of a ball bearing as has traveled along the pocket outwardly sloping surface.

17. The hub with clutch as recited in claim 13, further including bearings formed to receive the axle fitted therethrough that each include an outer race of a diameter to fit in cavities formed in the first and second sleeves ends.

18. The hub with clutch as recited in claim 13, wherein the first sleeve includes, as the means for mounting a driven gear thereon, a plurality of spaced raised sections formed as longitudinal sections formed around the first sleeve exterior surface that are to receive a center opening formed through a gear or gears that are to slide over said spaced raised sections and lock thereon.

* * * * *